(12) United States Patent
Horváth et al.

(10) Patent No.: US 7,822,397 B2
(45) Date of Patent: Oct. 26, 2010

(54) METHOD AND APPARATUS FOR FREQUENCY HOPPING MEDIUM ACCESS CONTROL IN A WIRELESS NETWORK

(75) Inventors: Vince András Horváth, Budapest (HU); Krisztián Kovács, Alsónémedi (HU); Miklós Lukács, Budapest (HU); András Hegyi, Székesfehérvár (HU); Tibor Keller, Budakeszi (HU)

(73) Assignee: Silicon Laboratories Inc., Austin, TX (US)

( * ) Notice: Subject to any disclaimer, the term of this patent is extended or adjusted under 35 U.S.C. 154(b) by 1160 days.

(21) Appl. No.: 11/366,675

(22) Filed: Mar. 2, 2006

(65) Prior Publication Data

US 2006/0146914 A1 Jul. 6, 2006

Related U.S. Application Data

(63) Continuation-in-part of application No. 11/211,243, filed on Aug. 25, 2005, now abandoned.

(60) Provisional application No. 60/604,975, filed on Aug. 27, 2004, provisional application No. 60/657,964, filed on Mar. 2, 2005.

(51) Int. Cl.
*H04B 1/18* (2006.01)

(52) U.S. Cl. .................. 455/161.3; 455/73; 455/161.1; 455/161.2; 455/521

(58) Field of Classification Search .............. 455/161.3
See application file for complete search history.

(56) References Cited

U.S. PATENT DOCUMENTS

| | | | |
|---|---|---|---|
| 4,157,217 A | 6/1979 | Isono | 396/102 |
| 4,298,988 A | 11/1981 | Dages | 455/182.1 |
| 4,379,946 A | 4/1983 | Mizuno et al. | 178/3 |
| 4,519,068 A | 5/1985 | Krebs et al. | 370/82 |
| 4,554,668 A | 11/1985 | Deman et al. | 375/1 |
| 4,691,341 A | 9/1987 | Knoble et al. | 379/93.26 |
| 5,107,522 A | 4/1992 | Kitayama et al. | 375/344 |
| 5,231,634 A | 7/1993 | Giles et al. | 370/95.1 |
| 5,371,734 A | 12/1994 | Fischer | 370/18 |

(Continued)

OTHER PUBLICATIONS

Search Report—Application #05255269.2-2415, Dec 20, 2005, 7 pages.

(Continued)

*Primary Examiner*—Duc Nguyen
*Assistant Examiner*—Ajibola Akinyemi
(74) *Attorney, Agent, or Firm*—O'Keefe, Egan, Peterman & Enders LLP

(57) ABSTRACT

A method and apparatus for medium access control in a receiver is shown, involving frequency hopping through each of a plurality of channel frequencies for the receiver, monitoring a baseband section of the receiver using a data quality detector (DQD) circuit configured to assert a DQD signal when valid data is sensed at the output of a demodulator of the receiver, waiting a first preset period of time after changing the channel frequency for each frequency hop and monitoring whether the DQD signal is asserted, resuming frequency hopping if the DQD signal is not asserted within the first preset period of time, and maintaining a current channel frequency in order to receive a data packet if the DQD is asserted.

33 Claims, 7 Drawing Sheets

U.S. PATENT DOCUMENTS

| | | | | |
|---|---|---|---|---|
| 5,376,894 | A | 12/1994 | Petranovich | 329/306 |
| 5,400,366 | A | 3/1995 | Iwamatsu | 375/344 |
| 5,530,723 | A | 6/1996 | Maplestone | 375/344 |
| 5,548,619 | A | 8/1996 | Horiike et al. | 375/344 |
| 5,594,758 | A | 1/1997 | Petranovich | 375/344 |
| 5,638,371 | A | 6/1997 | Raychaudhuri et al. | 370/347 |
| 5,729,680 | A | 3/1998 | Belanger et al. | 395/200.1 |
| 6,226,505 | B1 | 5/2001 | Uda | 455/255 |
| 6,233,292 | B1 | 5/2001 | Van Bezooijen et al. | 375/344 |
| 6,304,136 | B1 * | 10/2001 | Rabii | 329/300 |
| 6,359,942 | B1 | 3/2002 | Duggan et al. | 375/335 |
| 6,466,608 | B1 | 10/2002 | Hong et al. | 375/137 |
| 6,560,215 | B1 | 5/2003 | Bloem et al. | 370/347 |
| 6,704,555 | B2 | 3/2004 | Sih et al. | 455/245.1 |
| 7,010,323 | B2 * | 3/2006 | Suwa | 455/552.1 |
| 7,020,178 | B2 * | 3/2006 | Mason et al. | 375/136 |
| 7,257,379 | B2 * | 8/2007 | Ozluturk et al. | 455/73 |
| 7,315,590 | B1 | 1/2008 | Okuyama et al. | 375/344 |
| 2004/0264620 | A1 | 12/2004 | Tanaka | 375/344 |

OTHER PUBLICATIONS

IA4420 Universal ISM Band FSK Transceiver, Integration Associates Inc. Jul. 2005, 29 pages.

IEEE P802.15-01/317r0 Wireless Personal Area Network, Jun. 2001, 9 pages.

USC/ISI Technical Report ISI-TR-580 Medium Access Control in Wireless Sensor Networks, Oct. 2003, 8 pp.

Poster:DSCR—A Wireless MAC Protocol Using Implicit Pipelining, Yang et al., Jun. 2003, 2 pp.

An Energy-Efficient MAC Protocol for Wireless Sensor Networks, Ye et al., 10 pp., Nov. 7, 2002.

* cited by examiner

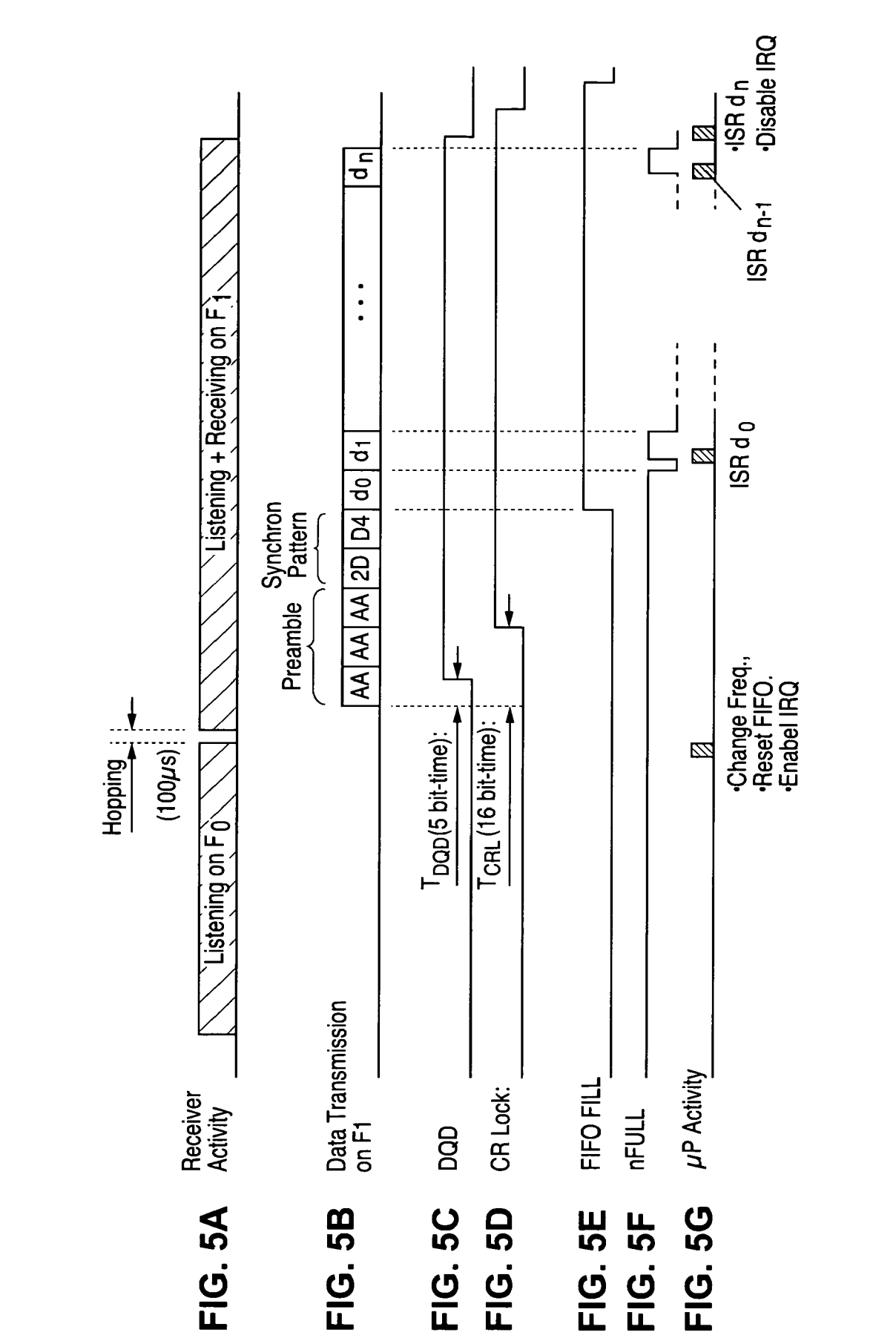

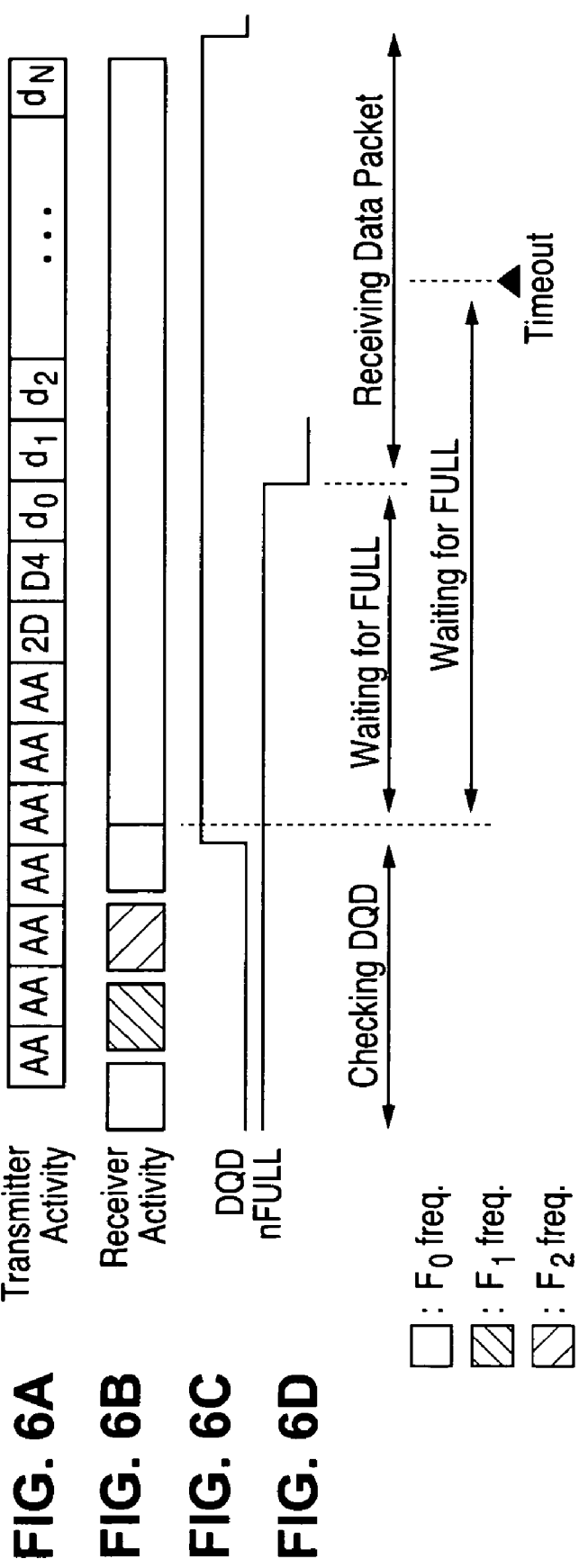
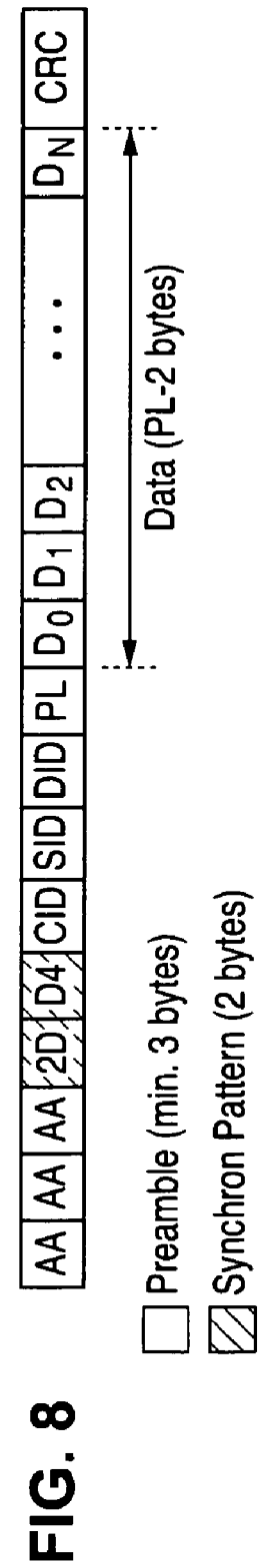

__US 7,822,397 B2__

METHOD AND APPARATUS FOR FREQUENCY HOPPING MEDIUM ACCESS CONTROL IN A WIRELESS NETWORK

CROSS-REFERENCE TO RELATED PATENT APPLICATIONS

This application claims priority from U.S. provisional patent application 60/657,964 entitled FREQUENCY HOPPING MEDIA ACCESS CONTROL PROTOCOL, filed Mar. 2, 2005, incorporated by reference in its entirety for all purposes. This application also claims priority to U.S. patent application Ser. No. 11/211,343 entitled APPARATUS AND METHOD FOR AUTOMATIC FREQUENCY CORRECTION FOR A RECEIVER SYSTEM filed Aug. 25, 2005, which, in turn, claims priority to U.S. Provisional Patent Application No. 60/604,975, filed Aug. 27, 2004, each incorporated by reference in its entirety for all purposes.

FIELD OF THE INVENTION

The present invention is directed toward medium access control in a wireless network and, more particularly, to improved medium access control related to frequency hopping.

BACKGROUND OF THE INVENTION

In many wireless communications networks, communication can take place on multiple channels. It can be difficult to monitor multiple channels and detect a transmission quickly enough to successfully receive the communication in the transmission. Also, a communication that is received may not be of interest to the receiver.

BRIEF SUMMARY OF THE INVENTION

An embodiment of a receiver, according to one embodiment of the invention, includes a radio frequency (RF) section that includes an amplifier configured to be coupled to an antenna and first and second mixers coupled to an output of the amplifier to recover first and second data channels, respectively, a baseband section that includes a first baseband block with an input coupled to an output of the first mixer and a second baseband block with an input coupled to an output of the second mixer, and a demodulator having a first input coupled to an output of the first baseband block and a second input coupled to an output of the second baseband block. The receiver also includes a data and clock recovery circuit having an input coupled to an output of the demodulator and a data quality detector (DQD) circuit having a first input coupled to the output of the first baseband block and a second input coupled to the output of the second baseband block, where the data quality detector circuit is configured to assert a DQD signal when valid data is sensed at the output of the demodulator. A controller of the receiver is configured to control a receive frequency of the RF section and monitor the DQD signal, where the controller is operable to frequency hop through each of a plurality of channel frequencies and, for each channel frequency, wait a first preset period of time after changing the channel frequency for the DQD signal to be asserted and, if the DQD signal is not asserted within the first preset period of time, resume frequency hopping and, if the DQD is asserted, maintain a current channel frequency in order to receive a data packet.

An embodiment of a method, according to the present invention, for medium access control in a receiver calls for frequency hopping through each of a plurality of channel frequencies for the receiver and monitoring a baseband section of the receiver using a data quality detector (DQD) circuit configured to assert a DQD signal when valid data is sensed at the output of a demodulator of the receiver. The method also calls for waiting a first preset period of time after changing the channel frequency for each frequency hop and monitoring whether the DQD signal is asserted. The method further recites resuming frequency hopping if the DQD signal is not asserted within the first preset period of time and maintaining a current channel frequency in order to receive a data packet if the DQD is asserted.

BRIEF DESCRIPTION OF THE DRAWINGS

A description of certain embodiments will proceed with reference to the following figures, wherein:

FIGS. 5A-5G are timing diagrams illustrating an embodiment of a receiving process in accordance with one aspect of the present invention;

FIGS. 6A-D are timing diagrams illustrating another example scenario showing how a receiver operating in accordance with an embodiment of the medium access control of the present invention cycles through the available frequencies and detects a transmission on the $F_0$ channel;

FIG. 8 is a packet diagram illustrating an embodiment of a data packet that contains some additional fields that may be utilized in some embodiments.

DETAILED DESCRIPTION OF THE INVENTION

Figure 1:
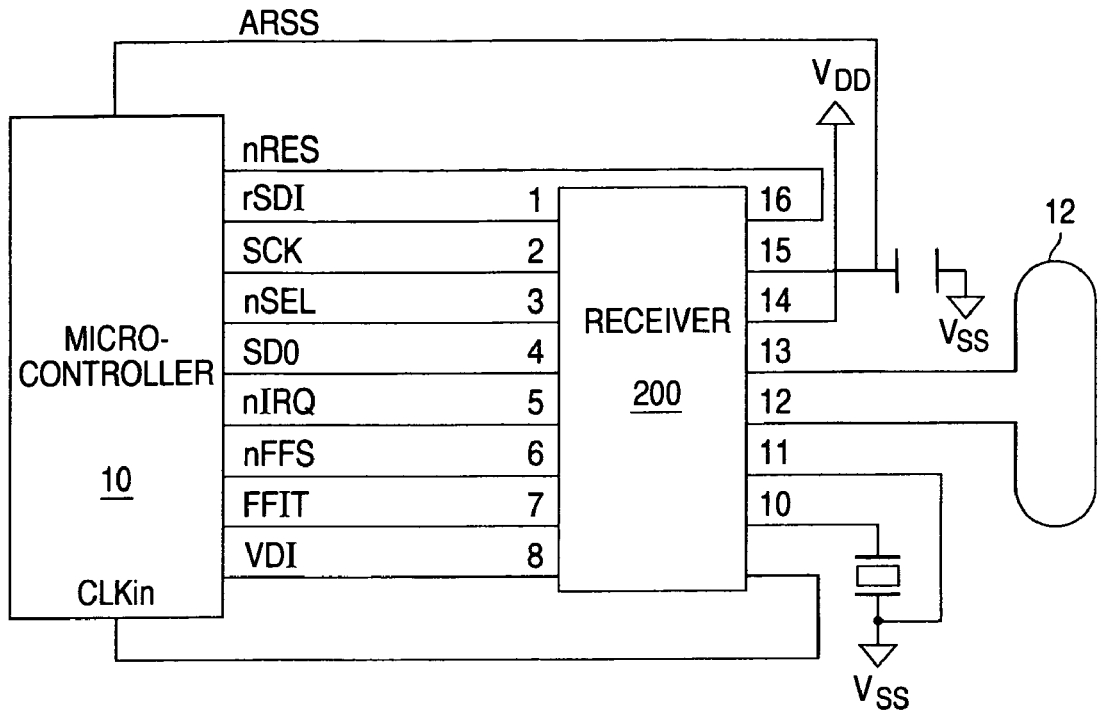
FIG. 1 is a functional block diagram illustrating an example of a microcontroller interfacing with a receiver circuit suitable for application of the present invention.

FIG. 1 is a functional block diagram illustrating an example of a microcontroller interfacing with a receiver circuit suitable for application of the present invention. Microcontroller 10 interfaces to receiver 200 through a series of interface lines that permit, in this example, receiver 200 to generate an interrupt signal (nIRQ) that spawns an interrupt service routine (ISR) in the microcontroller 10 that retrieves received data from receiver 200 through a serial data interface SDO and SCK. In a transceiver implementation, the microcontroller 10 can also output data for transmission. Receiver 200 is shown with a loop antenna 12 that is used to receive wireless transmissions.

Figure 2:
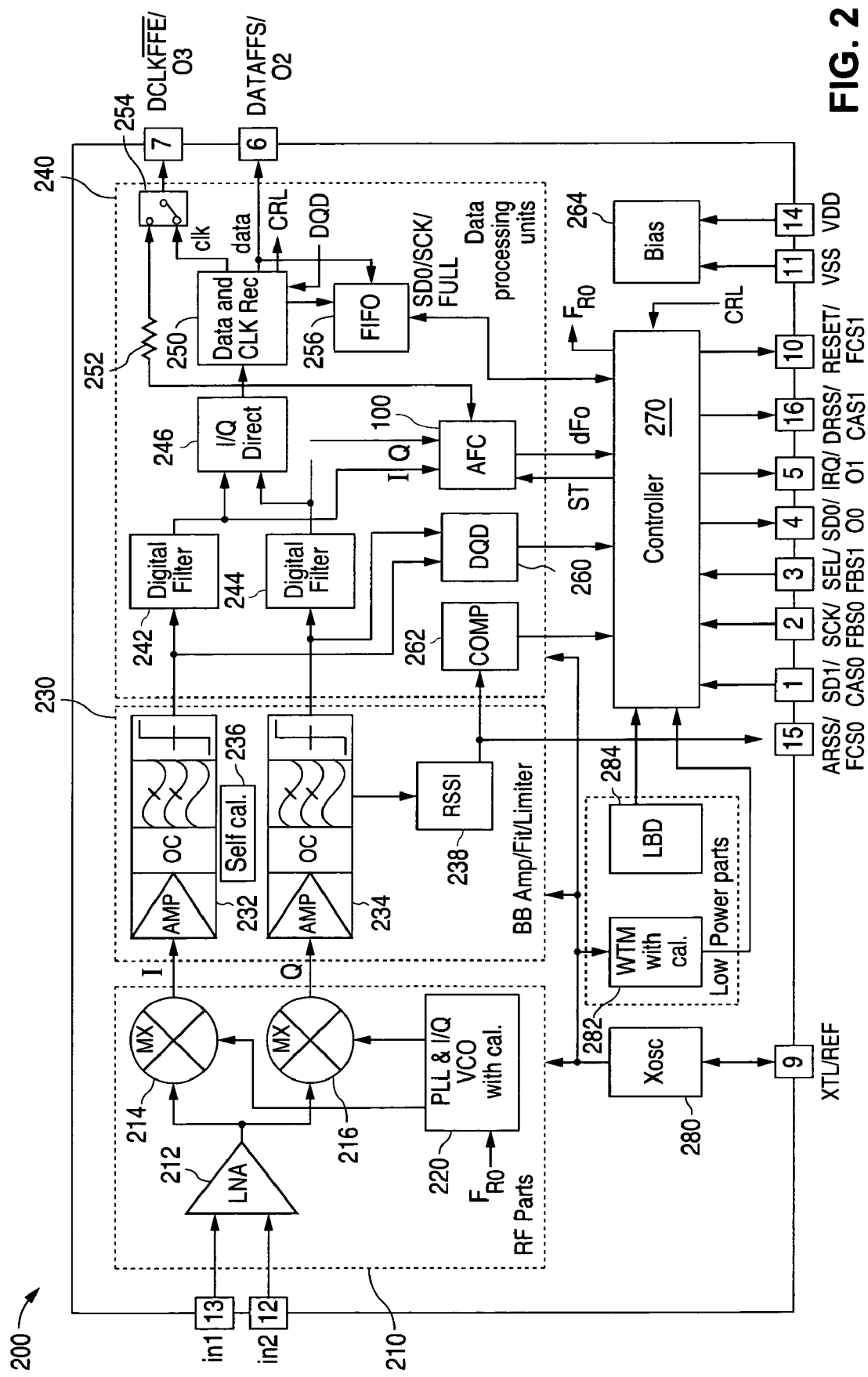
FIG. 2 is a functional block diagram illustrating one exemplary embodiment of the receiver circuit of FIG. 1 suitable for application of the present invention.

FIG. 2 illustrates an embodiment of a Frequency Shift Key (FSK) as receiver 200 of FIG. 1. FSK receiver 200 has a radio frequency (RF) section 210 that includes low noise amplifier (LNA) 212 that is configured for electrical coupling to an antenna through interface pins IN1 and IN2. LNA 212 receives and amplifies an RF signal that is output to mixers 214 and 216. Mixer 214 mixes the received signal with a first frequency to recover an I data channel from the received signal. Mixer 216 mixes the received signal with a second frequency that is an EXCLUSIVE ORed I and Q with the first frequency in order to recover a Q channel from the received signal.

The I and Q data channels are input to a baseband section 230. The I channel is input to a first baseband block 232 that performs amplification, offset correction, baseband filtering and limiting or low pass filtering on the I channel. A second baseband block 234 performs the same functions for the Q channel. Typically, the receiver bandwidth is selectable through programming of the bandwidth of the baseband filters, which allows the receiver characteristics to be set in accordance with the signal to be received. For example, the bandwidth can be chosen to accommodate FSK deviation, data rate and crystal tolerance requirements. A example of a low pass filter stage in the baseband blocks is a seventh order Butterworth low-pass filter with 40 dB suppression at twice the bandwidth frequency. Offset cancellation may be performed using a high-pass filter with a cut-off frequency below 7 kHz, for example. RSSI detector 238 monitors the input signal level in baseband blocks 232 or 234 and generates an RSSI signal through comparator 262 if the received signal strength exceeds a predetermined level. This RSSI signal is input to controller 270, in this example, for further processing, or may be output as signal ARRS to microcontroller 10 through output pin 15, which is also coupled to a ground potential rail $V_{SS}$ through a capacitor, as shown in FIG. 1.

A data processing and clock recovery section 240 extracts data and clock signals from the received signal. The I and Q channel data output from baseband blocks 232 and 234, respectively, is input to digital filters 242 and 244, respectively. The digitally filtered I and Q channels output by digital filters 242 and 244 are input to I/Q demodulator 246, which demodulates the I and Q channels to derive a digital data signal from the received signal, which is input to data filter and clock recovery circuit 250. The data filter and clock recovery circuit 250 uses a clock frequency that is, in this example, 29 times the bit rate to recover the received data along with a recovered clock signal that is synchronized to the received data. The clock recovery circuitry may provide different modes, such as slow, for higher noise immunity and more accurate data timing, but slower settling time as compared to fast mode. The circuit may also operate automatically, where it starts in fast mode and switches to slow mode after locking onto the recovered signal. The recovered clock signal may be used to load received data into a data buffer, FIFO 256.

A switch 254 permits either the unfiltered data signal from I/Q demodulator 246, through resistor 252, or the recovered data clock from data filter and clock recovery circuit 250 to be output from the receiver circuit. A Data Quality Detector 260 is provided that counts spikes on the unfiltered received data and determines whether the number of spikes exceeds a threshold value that is predetermined or programmed into the receiver.

The I and Q inputs of AFC circuit 100 are coupled to the outputs of baseband blocks 230 and 232, respectively. The Data input of AFC circuit 100 is coupled to the data output of data filter and clock recovery circuit 250. The Xclk input of AFC circuit 100 is coupled to the output of crystal oscillator 280. Crystal oscillator 280 provides a reference clock signal, e.g. 10 MHz, to AFC circuit 100, PLL circuit 220, as well as other circuits in the receiver. Bias circuit 264 provides power and biasing to the components of the receiver circuit. This example also includes a low battery detector (LBD) 284 that provides a warning signal to controller 270 as well as a wake-up timer 282 that provides a timer signal to controller 270.

In this example, control signal ST for enabling output latch 128 of FIG. 1 is provided by controller 270. The $dF_O$ signal output from latch 128 is input to controller 270. In one example of a clock offset correction process, controller 270 senses, through either RSSI 238 or DQD 260, that a valid signal is being received by the receiver circuit. When the valid signal is detected, controller 270 enables the measurement time counters 112 and 118 in FIG. 1 through, for example, gating the clock signal from crystal oscillator 280 to the Xclk input of AFC circuit 100. Controller 270 then waits for a period sufficient to allow the timers to AFC circuit 100 to complete and the remainder of AFC circuit 100 to calculate the frequency offset value $dF_A$ before the controller 270 asserts the ST signal to latch the offset value into output latch 128. Controller 270 then receives the value of $dF_O$ output by AFC circuit 100 and adds it to the current value of the PLL frequency $F_{RO}$, which may be stored in memory in controller 270, before outputting the new offset corrected frequency value for $F_{RO}$ to PLL 220. Other implementations are possible where control of the receiver is performed by an external processor where a control interface is provided, e.g. for receiving a control word and outputting the value of $dF_O$, for the external processor to control the function of AFC circuit 100, the PLL 220, and other components of the receiver circuit.

Figure 3:
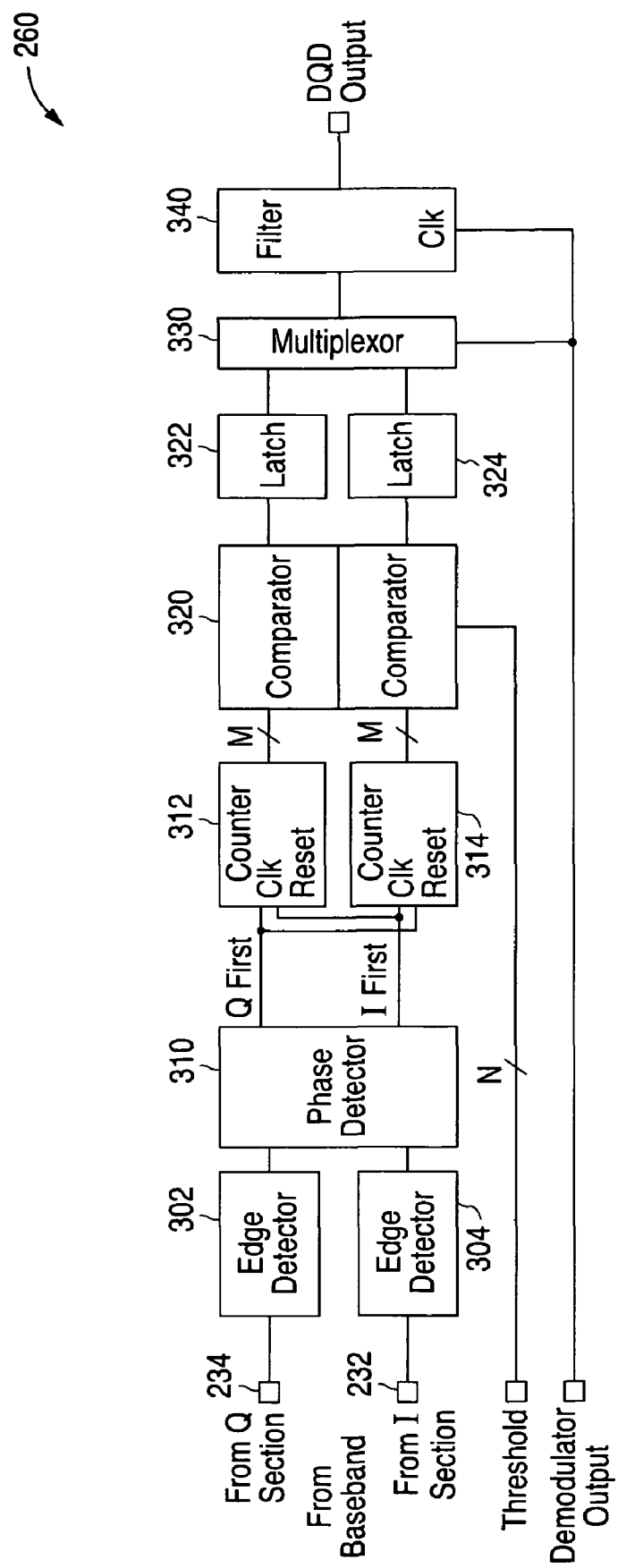
FIG. 3 is a functional block diagram illustrating one exemplary embodiment of the DQD circuit of FIG. 2 suitable for use with the present invention.

In the case of an FSK modulated signal, such as the signal received by the FSK receiver 200 illustrated in FIG. 2, the DQD circuit 260 counts consecutive I/Q channel phase relationships and compares the counts with a preset or programmed threshold limit in order to obtain a signal that reflects the data quality, e.g. the reliability of the information, of the received signal. FIG. 3 is a functional block diagram illustrating one exemplary embodiment of the DQD circuit of FIG. 2 suitable for use with the present invention. The DQD signal goes high when valid data is sensed at the output of demodulator instead of noise. In the example of FIG. 2, an zero intermediate frequency (IF) receiver architecture is shown. This means that the frequency observed in the IF section of the receiver is basically the deviation of the received signal, where deviation is the amount of frequency shift in Hertz from the carrier frequency that is used for encoding data bits. In one embodiment, the DQD circuit counts the transitions after the base-band filter in the IF channel, e.g. the outputs of I channel IF section 232 and Q channel IF section 234, in both the I and Q channels. The number of transitions per branch is the deviation/bit-rate. When the bit-rate equals the deviation, then a total of four transitions should be counted by the DQD circuit, e.g. two in the I channel and two in the Q channel. If the bit-rate is half the deviation, then a total of eight transitions should be observed and counted by the DQD circuit, e.g. four in each of the I and Q channels, and so on for different relationships between the bit-rate and the deviation. If the number of received transitions is different from the number expected for the given deviation and bit-rate, then the data quality of the received signal is lower than expected.

In the embodiment of DQD circuit 260 shown in FIG. 3, the output of Q baseband block 234 is input to a first edge detector 302 and the output of I baseband block 232 is input to edge detector 304. The outputs of edge detectors 302 and 304, in turn, are input to phase detector 310. A Q output of phase detector 310 is coupled to a clock input of counter 312 and a reset input of counter 314. Similarly, an I output of phase detector 314 is coupled to the clock input of counter 314 and the reset input of counter 312. The outputs of counters 312 and 314 are input to comparator 320, where the count values are compared to a threshold value that is preset or programmed into receiver 200. Setting the threshold level to a value of four or higher is preferred because it obtains good separation results for identifying valid transmissions versus spurious transmissions. Comparator 320 compares both count values to the threshold value and separately outputs the results, where the results are latched by latches 322 and 324. The DQD circuit 260 counts the pulses for the I branch when a logic 1 is received or in the Q branch when a logic 0 is received. The output of the demodulator can be viewed as a received data bit, which is used to determine which of the I and Q branches to process by controlling the multiplexor 330. In this embodiment, multiplexor 330 selects latched comparison results for output to filter 340 under the control of the output of demodulator 246.

A noise signal can occasionally appear to be a received data signal for a short period of time. The data filter 340 performs an averaging function in order to filter out these sorts of spurious noise pulses. If the comparator results do not consistently indicate a good signal over several clock cycles, then the signal is likely a spurious noise signal. The DQD signal is output by filter 340 to controller 270. A logic high signal indicates the DQD circuit 260 has detected a reliable signal and a logic low indicates that it has not.

Figure 4:
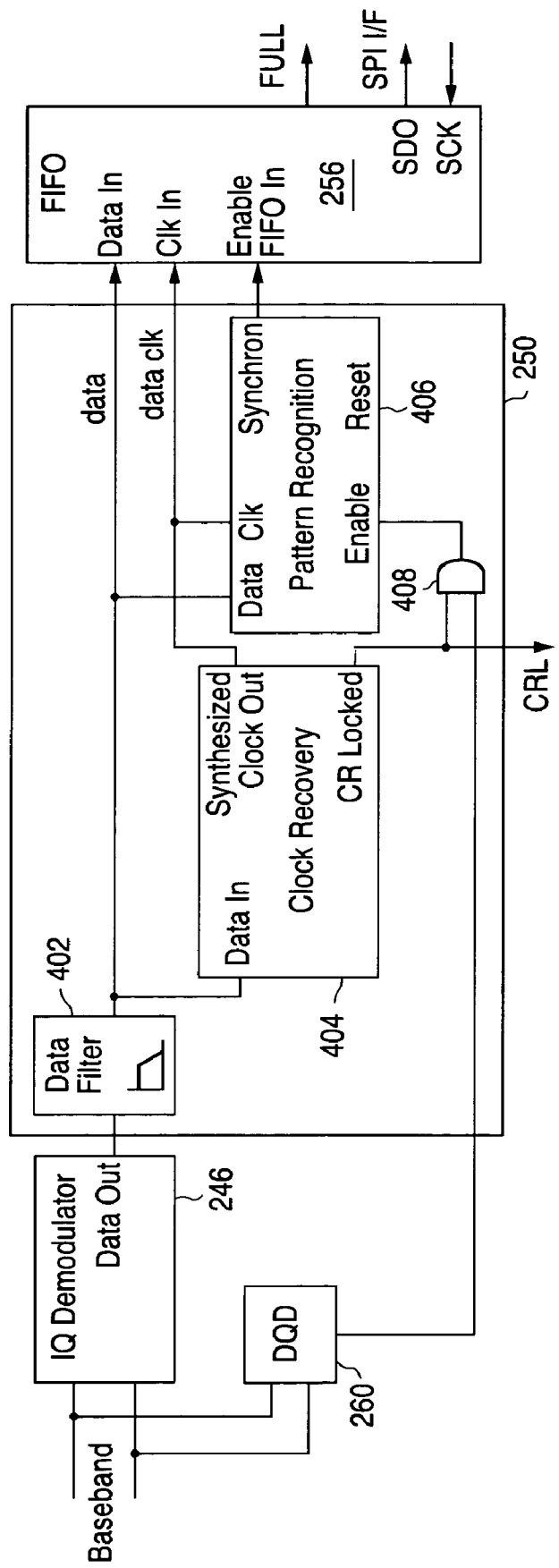
FIG. 4 is a functional block diagram illustrating an exemplary embodiment of the data filter and clock recovery circuit of FIG. 2 suitable for use with one aspect of the present invention.

FIG. 4 is a functional block diagram illustrating an exemplary embodiment of the data filter and clock recovery circuit of FIG. 2 suitable for use with one aspect of the present invention. Data filter 402 is coupled to the output of I/Q demodulator 246. The output of data filter 402 represents the received data signal, which is output to FIFO 256.

Clock recovery circuit 404 is coupled to the output of data filter 402 and synthesizes a recovered clock signal that is output to FIFO 256 as a data clock signal synchronized to the received data signal. The clock recovery circuit 404 is continuously trying to synchronize a data clock upon the high to low and low to high transitions of the demodulated data signal output by data filter 402. If the falling edge of the synchronized data clock signal matches the transients of the demodulated data for a predetermined number of clock periods, which can be preset or programmed into the receiver circuit 200, then the clock recovery circuit will set the clock recovery locked CRL signal to an active state, which is high in this example.

Pattern recognition circuit 406 receives the demodulated data signal from data filter 402, the synthesized clock signal from clock recovery circuit 404, and the output of AND gate 408, which logically ANDs the CRL signal and the DQD signal from DQD circuit 260. The pattern recognition circuit 406 is continuously comparing the last sixteen bits, in this example, of the received data signal to a preset bit pattern (hexadecimal 2DD4, in this example), which may be fused into the pattern recognition circuit 406. When the last sixteen bits of received data matches the preset bit pattern, then the pattern recognition circuit 406 circuit asserts a synchronization signal that enables FIFO 256 and causes the subsequently received data to fill the FIFO. When the number of data bits in FIFO 256 reaches a preset level, then, in one embodiment, receiver 200 will assert an interrupt request (nIRQ) to microcontroller 10 so that it can read the data from the FIFO.

FIGS. 5A-G are timing diagrams illustrating an embodiment of a receiving process in accordance with one aspect of the present invention. FIG. 5A illustrates the activity of receiver 200 under the control of controller 270 in hopping from a first frequency $F_0$ to a second frequency $F_1$. In this embodiment, the media access control protocol is performed by controller 270. Controller 270 first tunes receiver 200 to receive data on a first channel with center frequency $F_0$. The controller monitors the DQD signal for a listen cycle in order to detect whether there is a transmission on the channel and then moves to the next channel if no transmission is detected. DQD circuit 260 typically requires several bit-times in order to detect a signal, which may vary depending on the number of spikes the DQD circuit is configured to detect before asserting the DQD signal. In the example of FIGS. 5A-G, a DQD signal reaction time of five or six bit periods is assumed along with a data rate of 9600 kbps, which results in a listen cycle time of approximately 1 millisecond, e.g. 900 μseconds for listening plus 100 μseconds for hopping between the $F_0$ and $F_1$ frequencies.

In the example shown, receiver 200 tunes the receiver to frequency $F_0$ and monitors the DQD signal for one listen cycle. There is no transmission at $F_0$ and the DQD signal remains logic low. After waiting one listen cycle with no activity on the DQD signal, controller 270 tunes the receiver to frequency $F_1$ and monitors the DQD signal to detect transmission activity. When changing the receiver frequency during a hop, the FIFO is reset. In the scenario shown, there is a transmission on the $F_1$ channel, which results in the DQD signal going active after the DQD signal reaction time period $T_{DQD}$, which occurs during a first preamble byte of the received packet, where the preamble pattern is hexadecimal AA in this example. The nIRQ line is enabled after the DQD signal goes active. In this example, the CRL signal will go active after approximately sixteen bit time periods $T_{CRL}$ as a result of receiving the sixteen bits of valid data, which allows the clock recovery circuit 250 to lock onto the recovered data clock signal. Subsequent to the preamble, the transmission includes a synchronization pattern of hexadecimal 2DD4, in this example, which pattern recognition circuit 406 detects causing it to enable FIFO 256 to fill with the subsequent data bytes, e.g. $d_0$, $d_1$, etc. As each byte of data is received in FIFO 256, the nIRQ line is asserted to trigger an interrupt service routine in microcontroller 10 to read out the data byte from the FIFO. This process continues until the last data byte $d_n$ is received and the data transmission on frequency $F_1$ ceases. Once transmission ceases, the DQD and CRL signals will go inactive. At this point, controller 270 disables the nIRQ line and can either continue listening on the $F_1$ channel for another transmission or resume frequency hopping on all the available channels in search of transmissions on other channels.

By using the DQD signal to quickly detect the presence of a valid transmission on each channel, the medium access control of the present invention permits the receiver to rapidly monitor the available frequencies for transmission. FIGS. 6A-D are timing diagrams illustrating another example scenario showing how a receiver operating in accordance with an embodiment of the medium access control of the present invention cycles through the available frequencies and detects a transmission on the $F_0$ channel. In the scenario shown, a transmitter begins transmitting the preamble pattern of a packet on channel $F_0$, where the packet is composed of seven preamble bytes of hexadecimal AA, followed by two bytes of synchronization pattern of hexadecimal 2DD4, followed by n bytes of data, as illustrated in FIG. 6A. FIG. 6B illustrates that the receiver is initially listening on the $F_0$ channel, but too late for the DQD circuit to detect the transmission and assert the DQD signal, as illustrated in FIG. 6C. The receiver uses the DQD signal to detect a transmission in the currently selected frequency channel in order to quickly check for a valid transmission and, if one is not detected, change to the next frequency channel. If the DQD signal indicates a valid transmission, e.g. a Frequency Shift Keyed (FSK) transmission in this example, the receiver will not change the frequency, but will try to receive the packet. In this example, the receiver hops to the $F_1$ channel, then the $F_2$ channel, and returns to the $F_0$ channel, where the DQD signal detects the transmission and the receiver begins reception of the packet.

In the example of FIGS. 6A-D, if an actual FSK transmission is coming from a unit within the wireless network, then FIFO 256 of receiver 200 will assert the FULL signal after the first data byte d0 has been received. If the receiver does not assert the FULL signal within a given time period, e.g. timeout, then the MAC controller 270 may treat this transmission as a message external to the network and will resume searching for a valid network transmission by discarding the transmission and change the receiver frequency to the next channel, e.g. $F_1$. The number of preamble bytes needed for transmissions in the network to be received efficiently is related to the number of frequency channels used. In the example shown, where there are three frequency channels to be monitored, one byte of preamble for each channel, plus one byte of preamble for the DQD reaction time (e.g. 5-6 bit periods), plus another byte to account for partial transmission of a preamble byte yields four to five bytes of preamble. In the example of FIG. 6, the transmitted packet contains seven bytes of preamble.

The minimum time period for the MAC controller 270 to wait for the FULL signal to be asserted is related to the size of the packet header including preamble bytes, synchronization pattern and any address bytes that may be included. In the example shown, there are seven bytes of preamble, two bytes of synchronization pattern, plus the first byte of data d0. Therefore, a minimum timeout period of ten byte periods is preferred in this example.

Figure 7:
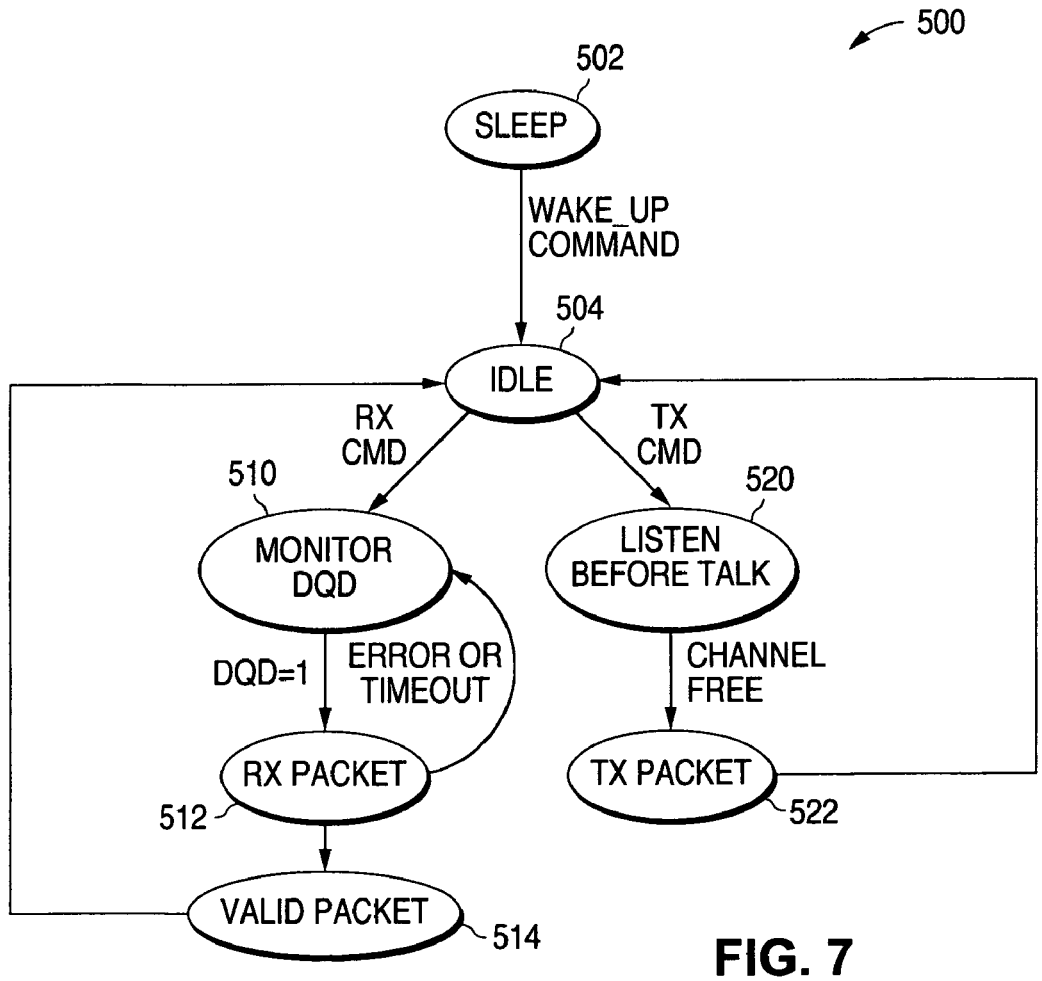
FIG. 7 is a state diagram illustrating one example of a state machine for a controller in a transceiver based embodiment.

FIG. 7 is a state diagram illustrating one example of a state machine 500 for controller 270 for a transceiver based embodiment. This a general state machine to illustrate one example of the process that could operate in controller 270. State machine 500 initializes in SLEEP state 502, where the transmitter and receiver are inactive and, preferably, powered down to conserve power. In this embodiment, a wake-up command from microcontroller 10 causes the state to switch to IDLE state 504. In the IDLE state, the controller 270 waits for either a receive or transmit command from microcontroller 10.

If the controller receives a receive command, it transitions to the MONITOR DQD state 510, where the controller frequency hops through the available frequency channels and monitors the DQD signal for a valid transmission. If the DQD circuit 260 detects a valid transmission, it asserts the DQD signal and controller 270 transitions to the RX PACKET state 512, where it starts a timer waiting for the FULL signal from FIFO 256. If the timer times out waiting for the FULL signal or there is an error in receiving a packet, such as a CRC error, then control transitions back to the MONITOR DQD state 510. If a valid packet is received, control transitions to VALID PACKET state 514 where, for example, an address in the packet is checked, as discussed further below, and the nIRQ line is asserted to alert microcontroller 10 that data has been received. After the data packet is read by microcontroller 10, or if an idle command is received from microcontroller 10, control transitions to IDLE.

If the controller receives a transmit command while in IDLE state 504, then it transitions to LISTEN BEFORE TALK state 520, where the controller 270 tunes the receiver 200 to the desired channel frequency, monitors the DQD signal for a given period of time to determine if there is another transmitter device is currently transmitting on the channel. When the channel is free, e.g. DQD is not asserted after the given time period, control transitions to TX PACKET state 522, where a data packet is transmitted. Note that the LISTEN BEFORE TALK state 520 is optional and control can transition directly to TX PACKET 522 for transmission. After transmission of the packet is complete, control moves to IDLE state 504. A sleep command from microcontroller 10 may be used to cause a transition from IDLE state 504 back to SLEEP state 502.

FIG. 8 is a packet diagram illustrating an embodiment of a data packet that contains some additional fields that may be utilized in some embodiments. In addition to three bytes of preamble of hexadecimal AA and two bytes of synchronization pattern hexadecimal 2DD4, the packet includes, in this example, three identification fields, which may be one byte each or may be sub-fields of a byte or bytes. In this example, there are three address identification fields CID, SID and DID, which are one byte each. In this embodiment, the CID field is a customer identifier that is used to identify different types of systems that may be installed in proximity to one another. For example, different vendors of transmitters and receivers may be assigned a unique CID value so that the vendor's parts can recognize one another. The SID field is a sender identifier field that identifies the transmitting node. The DID field is a destination identifier field that identifies the intended receiving node. The address identification fields may be used to filter out packets that are not intended for the receiver node. A PL field is also includes that represents the number N of data packets in the packet that follow the PL byte. Finally, a CRC field is included that contains a cyclic redundancy code for the packet to verify that the packet was not corrupted in transmission.

Figure 9:
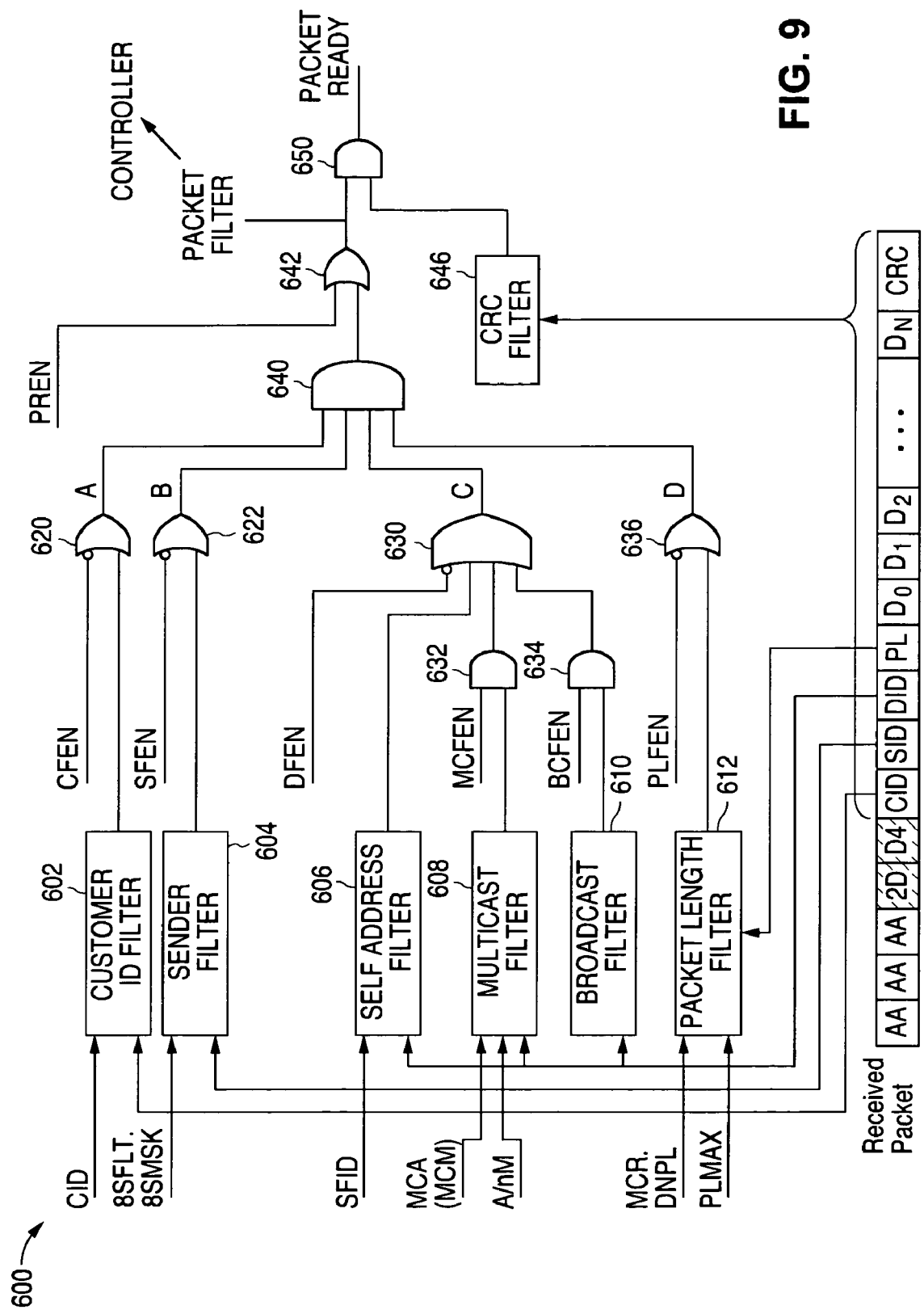
FIG. 9 is a logic circuit diagram illustrating an embodiment of a filtering circuit that may be used with the receiver of FIG. 2 in order to filter the fields illustrated in the packet of FIG. 8.

FIG. 9 is a logic circuit diagram illustrating an embodiment of a packet filtering circuit 600 that may be used with the receiver 200 in order to filter the fields illustrated in the packet of FIG. 8. Filter circuit 600 includes a series of filters that are preferably programmable, but may have preset values. Customer ID filter 602 contains the customer ID value, e.g. in a register, for packets to be received by the receiver 200. When customer ID filtering is enabled by the CFEN signal, which may be set by controller 270, hardwired, or otherwise determined, then the CID field from the received packet will be compared to the customer ID value in the filter 602 and the result of the comparison will propagate through OR gate 620, AND gate 640, and OR gate 642 to AND gate 650 to the PACKET READY signal, which is received by controller 270 and may be used in a validation process in the VALID PACKET state 514 of FIG. 7. If the CID value of the received packet matches the customer ID value of the filter 602, then the packet will be validated. Otherwise, the packet will be discarded by the receiver node.

Similarly, a sender filter 604 may be configured with a sender ID value that is compared to the SID field of the received packet. If sender filtering SFEN signal is enabled by controller 270, in this example, then result of the comparison propagates through OR gate 622 to the PACKET READY signal. If the SID value of the received packet matches the sender ID value of the filter 604, then the packet will be validated. Otherwise, the packet will be discarded by the receiver node.

A self address filter 606 may be configured with a destination ID value that is compared to the DID field of the received packet. The destination ID generally pertains to the receiver node itself. Also, filter 606 may be configured with a mask to detect multiple addresses. If destination filtering DFEN signal is enabled by controller 270, in this example, then result of the comparison propagates through OR gate 630 to the PACKET READY signal. If the DID value of the received packet matches the destination ID value of the filter 606, then the packet will be validated. Otherwise, the packet will be discarded by the receiver node. Likewise, multicast filter 608 may be configured with a multicast address value or mask that is compared to the DID field of the received packet. If multicast filtering MCFEN signal is enabled by controller 270, then the result of the comparison propagates through AND gate 634 and OR gate 630 to the PACKET READY signal.

Note that the logic implemented in the packet filtering circuit of FIG. 9 may also be implemented within controller 270. The packet data can be buffered within controller 270 and logic implemented in machine code for controller 270 compares the field data to the preset or programmed values in order to determine whether the packet is valid. For example, the customer ID value may be stored in a register in controller 270 and compared to the CID field of the buffered packet in order to make a determination of whether to resume frequency hopping to monitor other channel frequencies. Since the controller 270 controls the channel frequency and, therefore, frequency hopping behavior, this approach may be preferable.

In one embodiment, the validate packet state 514 in FIG. 7 of controller 270 includes enabling the desired filtering by setting the corresponding enable signals that control filter circuit 600. Controller 270 then checks the PACKET READY signal in order to validate the received packet. If the packet does not have the proper CID, SID, DID, etc., value, then the packet is not valid and it is discarded by the receiver 200. In an alternative receiving process, any of the monitor state 510, receive packet state 512, or validate packet state 514 in FIG. 7 can be modified to use the filtering functionality made available by filter circuit 600 to detect and reject the packet before reception is complete. For example, the CFEN signal can be set and, if the CID value of the received packet does not match the customer ID value provided to customer ID filter 602, then, after slightly longer than one byte period from receiving the synchronization pattern 2DD4, in this example, if the PACKET READY signal is not asserted indicating a filter match, then controller 270 can discard the packet and resume monitoring other frequency channels for transmissions. Similar approaches can be had using the other filter values and circuitry.

Similarly, the clock recovery locked signal CRL obtained from clock recovery circuit 250, shown in FIGS. 2 and 4, can be monitored by controller 270 and used to make a fast decision on whether a transmission is valid. For example, if the CRL signal is not asserted within several byte periods of the DQD signal being asserted, then the packet may be discarded and controller 270 may resume monitoring other frequency channels.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A receiver circuit, the circuit comprising:
   a radio frequency (RF) section that includes an amplifier configured to be coupled to an antenna and first and second mixers coupled to an output of the amplifier to recover first and second data channels, respectively;
   a baseband section that includes a first baseband block with an input coupled to an output of the first mixer and a second baseband block with an input coupled to an output of the second mixer;
   a demodulator having a first input coupled to an output of the first baseband block and a second input coupled to an output of the second baseband block;
   a data and clock recovery circuit having an input coupled to an output of the demodulator;
   a data quality detector (DQD) circuit configured to indicate the presence or absence of a packetized data transmission at the output of the demodulator by asserting a DQD signal only upon detection of the packetized data transmission at the output of the demodulator and by not asserting the DQD signal when no packetized data transmission is detected at the output of the demodulator, the DQD circuit having a first input coupled to the output of the first baseband block and a second input coupled to the output of the second baseband block, where the DQD circuit is configured to detect the presence or absence of the packetized data transmission at the output of the demodulator by:
      counting spikes on received data and comparing the measured number of spikes to a predetermined threshold value to determine if the measured number of spikes exceeds the predetermined threshold value, and
      only asserting the DQD signal when the measured number of spikes exceeds the predetermined threshold value and not asserting the DQD signal when the measured number of spikes does not exceed the predetermined threshold value; and
   a controller configured to control a receive frequency of the RF section and monitor the DQD signal, where the controller is operable to frequency hop through each of a plurality of channel frequencies and, for each channel frequency, wait a first preset period of time after changing the channel frequency for the DQD signal to be asserted and, if the DQD signal is not asserted within the first preset period of time, resume frequency hopping and, if the DQD is asserted, maintain a current channel frequency in order to receive a data packet of the detected packetized data transmission.

2. The receiver circuit of claim 1, wherein:
   the data and clock recovery circuit is configured to generate a clock recovery lock signal by trying to synchronize a data clock upon the high to low and low to high transitions of a demodulated data signal output by the demodulator and, if the edge of the synchronized data clock signal matches the transients of the demodulated data for a predetermined number of clock periods, then the clock recovery lock signal is asserted; and the controller is further configured to wait a second preset period of time after changing the channel frequency for the clock recovery lock signal to be asserted and resume frequency hopping if the clock recovery lock signal is not asserted within the second preset period of time.

3. The receiver circuit of claim 1, wherein the receiver includes a data buffer circuit that receives data and clock signals output by the data and clock recovery circuit, where the data buffer circuit is configured to assert a buffer full signal when the data buffer has filled with a unit of received data; and the controller is further configured to wait a third preset period of time after the DQD signal is asserted for the buffer full signal to be asserted and resume frequency hopping if the buffer full signal is not asserted within the third preset period of time, where the third present preset period of time is related to a size of header data expected for a transmitted packet plus a data byte period.

4. The receiver circuit of claim 1, wherein the receiver includes a packet filtering circuit that receives a data packet and compares a value in at least one field of the data packet to a corresponding preset value and asserts a packet ready signal if the values match; and the controller is further configured to wait a fourth preset period of time after the DQD signal is asserted for the packet ready signal and resume frequency hopping if the packet ready signal is not asserted within the fourth preset period of time.

5. The receiver circuit of claim 4, where the at least one field of the data packet includes at least one of a customer identification field, a sender identification field, a destination identification field, a multicast identification field, a broadcast identification field, and a packet length field.

6. The receiver circuit of claim 4, where the controller is further configured to buffer at least part of a data packet and compare a value in at least one field of the data packet to a corresponding preset value and resume frequency hopping if the values do not match.

7. The receiver circuit of claim 6, where the at least one field of the data packet includes at least one of a customer identification field, a sender identification field, a destination identification field, a multicast identification field, a broadcast identification field, and a packet length field.

8. The receiver circuit of claim 7, where the controller is further configured to resume frequency hopping as soon as the value of the at least one field of the data packet is found not to match the preset value and before the entire data packet is received.

9. The receiver circuit of claim 1, where the DQD circuit further comprises:

a first edge detector having an input coupled to the output of the first baseband block;

a second edge detector having an input coupled to the output of the second baseband block;

a phase detector having a first input coupled to an output of the first edge detector and a second input coupled to an output of the second edge detector;

a first counter having a clock input coupled to a first output of the phase detector and a reset input coupled to a second output of the phase detector;

a second counter having a clock input coupled to the second output of the phase detector and a reset input coupled to the first output of the phase detector;

a comparator having a first input coupled to an output of the first counter, a second input coupled to an output of the second counter, and a third input for receiving a threshold value, where the comparator compares the threshold value to the output of the first counter and outputs the result of the comparison to a first output and the comparator compares the threshold value to the output of the second counter and outputs the result of the comparison to a second output;

a first latch having an input coupled to the first output of the comparator;

a second latch having in input coupled to the second output of the comparator;

a multiplexor having a first input coupled to an output of the first latch and a second input coupled an output of the second latch, and a control input coupled to the output of the demodulator; and a filter having an input coupled to an output of the multiplexor, a clock input coupled to the output of the demodulator, and an output for outputting the DQD signal.

10. The receiver circuit of claim 1, where the data quality detector circuit is configured to assert a DQD signal only when presence of a packetized data transmission is sensed at the output of the demodulator by counting spikes on unfiltered received data and determining whether the number of spikes exceeds a predetermined threshold value; and to not assert the DQD signal when the measured number of spikes does not exceed the predetermined threshold value.

11. The receiver circuit of claim 1, wherein the receiver circuit is a Frequency Shift Key (FSK) receiver circuit; and where the data quality detector circuit is configured to assert a DQD signal only when presence of a packetized data transmission is sensed at the output of the demodulator by counting consecutive I/Q channel phase relationships in a received FSK modulated signal and determining whether the number of consecutive I/Q channel phase relationships exceeds a predetermined threshold value; and to not assert the DQD signal when the measured number of consecutive I/Q channel phase relationships does not exceed the predetermined threshold value.

12. The receiver circuit of claim 1, wherein the receiver circuit is a Frequency Shift Key (FSK) receiver circuit; and wherein the method further comprises monitoring a baseband section of the receiver using a DQD circuit configured to only assert a DQD signal when presence of a packetized data transmission is sensed at the output of the demodulator by counting consecutive I/Q channel phase relationships in a received FSK modulated signal and determining whether the number of consecutive I/Q channel phase relationships exceeds a predetermined threshold value; and to not assert the DQD signal when the measured number of consecutive I/Q channel phase relationships does not exceed the predetermined threshold value.

13. The receiver circuit of claim 1, wherein the DQD circuit is configured to only assert the DQD signal when the measured number of spikes consistently exceeds the predetermined threshold value over multiple clock signals, and not asserting the DQD signal when the measured number of spikes does not consistently exceed the predetermined threshold value over multiple clock signals.

14. A method for medium access control in a receiver, the method comprising the steps of:

frequency hopping through each of a plurality of channel frequencies for the receiver;

monitoring a baseband section of the receiver using a data quality detector (DQD) circuit configured to:

detect the presence or absence of a packetized data transmission at the output of the demodulator by counting spikes on received data and comparing the measured number of spikes to a predetermined threshold value to determine if the measured number of spikes exceeds the predetermined threshold value, and only asserting the DQD signal upon detection of the packetized data transmission at the output of the demodulator and not asserting the DQD signal when no packetized data transmission is detected at the output of the demodulator by only asserting the DQD signal when the measured number of spikes exceeds the predetermined threshold value and not asserting the DQD signal when the measured number of spikes does not exceed the predetermined threshold value;

waiting a first preset period of time after changing the channel frequency for each frequency hop and monitoring whether the DQD signal is asserted;

resuming frequency hopping if the DQD signal is not asserted within the first preset period of time; and maintaining a current channel frequency in order to receive a data packet if the DQD is asserted.

15. The method of claim 14, where the method includes the steps of:

generating a clock recovery lock signal by trying to synchronize a data clock upon the high to low and low to high transitions of a demodulated data signal output by the demodulator and, if the edge of the synchronized data clock signal matches the transients of the demodulated data for a predetermined number of clock periods, then the clock recovery lock signal is asserted;

waiting a second preset period of time after changing the channel frequency for each frequency hop and monitoring whether the clock recovery lock signal is asserted; and resuming frequency hopping if the clock recovery lock signal is not asserted within the second preset period of time.

16. The method of claim 14, where the method includes the steps of:

receiving data and clock signal output by a data and clock recovery circuit of the receiver using a data buffer circuit, where the data buffer circuit is configured to assert a buffer full signal when the data buffer has filled with a unit of received data;

waiting a third preset period of time after the DQD signal is asserted and monitoring whether the buffer full signal is asserted, where the third preset period of time is related to a size of header data expected for a transmitted packet plus a data byte period; and resuming frequency hopping if the buffer full signal is not asserted within the third preset period of time.

17. The method of claim 14, where the method includes the steps of:

buffering at least part of a data packet;

comparing a value in at least one field of the data packet to a corresponding preset value; and resuming frequency hopping if the preset value does not match the value in the at least one field of the data packet.

18. The method of claim 17, where the at least one field of the data packet includes at least one of a customer identification field, a sender identification field, a destination identification field, a multicast identification field, a broadcast identification field, and a packet length field.

19. The method of claim 17, where the step of resuming frequency hopping if the preset value does not match the value in the at least one field of the data packet further comprises resuming frequency hopping as soon as the value of the at least one field of the data packet is found not to match the preset value and before the entire data packet is received.

20. The method of claim 14, further comprising monitoring a baseband section of the receiver using a DQD circuit configured to only assert a DQD signal when presence of a packetized data transmission is sensed at the output of the demodulator of the receiver by counting spikes on unfiltered received data and determining whether the number of spikes exceeds a predetermined threshold value; and to not assert the DQD signal when the measured number of spikes does not exceed the predetermined threshold value.

21. The method of claim 14, wherein the DQD circuit is configured to only assert the DQD signal when the measured number of spikes consistently exceeds the predetermined threshold value over multiple clock signals, and not asserting the DQD signal when the measured number of spikes does not consistently exceed the predetermined threshold value over multiple clock signals.

22. An apparatus for medium access control in a receiver, the apparatus comprising:

means for monitoring a baseband section of the receiver and indicating when the presence of a packetized data transmission at the output of the demodulator is sensed at the output of a demodulator of the receiver by counting spikes on received data and determining whether the number of spikes exceeds a predetermined threshold value; and control means for frequency hopping through each of a plurality of channel frequencies for the receiver, waiting a first preset period of time after changing the channel frequency for each frequency hop and monitoring whether the presence of a packetized data transmission is detected at the output of the demodulator, resuming frequency hopping if the presence of a packetized data transmission is not detected at the output of the demodulator within the first preset period of time, and maintaining a current channel frequency in order to receive a data packet if the presence of a packetized data transmission is detected at the output of the demodulator.

23. The apparatus of claim 22, where the apparatus further includes means for generating a clock recovery lock signal by trying to synchronize a data clock upon the high to low and low to high transitions of a demodulated data signal output by the demodulator and, if the edge of the synchronized data clock signal matches the transients of the demodulated data for a predetermined number of clock periods, then the clock recovery lock signal is asserted; and the control means is further configured to wait a second preset period of time after, changing the channel frequency for each frequency hop, monitor whether the clock recovery lock signal is asserted, and resume frequency hopping if the clock recovery lock signal is not asserted within the second preset period of time.

24. The apparatus of claim 22, where the apparatus further includes:

means for receiving data and clock signal output by a data and clock recovery circuit of the receiver using a data buffer circuit, where the data buffer circuit is configured to assert a buffer full signal when the data buffer has filled with a unit of received data; and the control means is further configured to wait a third preset period of time after the presence of a packetized data transmission is detected at the output of the demodulator, monitor whether the buffer full signal is asserted, where the third preset period of time is related to a size of header data expected for a transmitted packet plus a data byte period, and resume frequency hopping if the buffer full signal is not asserted within the third preset period of time.

25. The apparatus of claim 22, where the apparatus further includes:
means for buffering at least part of a data packet; and
the control means is further configured to compare a value in at least one field of the data packet to a corresponding preset value and resume frequency hopping if the preset value does not match the value in the at least one field of the data packet.

26. The apparatus of claim 25, where the at least one field of the data packet includes at least one of a customer identification field, a sender identification field, a destination identification field, a multicast identification field, a broadcast identification field, and a packet length field.

27. The apparatus of claim 25, where the control means is further configured to resume frequency hopping as soon as the value of the at least one field of the data packet is found not to match the preset value and before the entire data packet is received.

28. The apparatus of claim 22, further comprising means for monitoring a baseband section of the receiver when the presence of a packetized data transmission is sensed at the output of a demodulator of the receiver by counting spikes on unfiltered received data and determining whether the number of spikes exceeds a predetermined threshold value.

29. The apparatus of claim 22, wherein the receiver circuit is a Frequency Shift Key (FSK) receiver circuit; and further comprising means for monitoring a baseband section of the receiver when the presence of a packetized data transmission is sensed at the output of a demodulator of the receiver by counting consecutive I/Q channel phase relationships in a received FSK modulated signal and determining whether the number of consecutive I/Q channel phase relationships exceeds a predetermined threshold value.

30. A receiver circuit, the circuit comprising:
a radio frequency (RF) section that includes an amplifier configured to be coupled to an antenna and first and second mixers coupled to an output of the amplifier to recover first and second data channels, respectively;
a baseband section that includes a first baseband block with an input coupled to an output of the first mixer and a second baseband block with an input coupled to an output of the second mixer;
a demodulator having a first input coupled to an output of the first baseband block and a second input coupled to an output of the second baseband block;
a data and clock recovery circuit having an input coupled to an output of the demodulator;
a data quality detector (DQD) circuit having a first input coupled to the output of the first baseband block and a second input coupled to the output of the second baseband block, where the data quality detector circuit is configured to assert a DQD signal when valid data is sensed at the output of the demodulator; and
a controller configured to control a receive frequency of the RF section and monitor the DQD signal, where the controller is operable to frequency hop through each of a plurality of channel frequencies and, for each channel frequency, wait a first preset period of time after changing the channel frequency for the DQD signal to be asserted and, if the DQD signal is not asserted within the first preset period of time, resume frequency hopping and, if the DQD is asserted, maintain a current channel frequency in order, to receive a data packet;
where the DQD circuit further comprises:
a first edge detector having an input coupled to the output of the first baseband block,
a second edge detector having an input coupled to the output of the second baseband block,
a phase detector having a first input coupled to an output of the first edge detector and a second input coupled to an output of the second edge detector,
a first counter having a clock input coupled to a first output of the phase detector and a reset input coupled to a second output of the phase detector,
a second counter having a clock input coupled to the second output of the phase detector and a reset input coupled to the first output of the phase detector,
a comparator having a first input coupled to an output of the first counter, a second input coupled to an output of the second counter, and a third input for receiving a threshold value, where the comparator compares the threshold value to the output of the first counter and outputs the result of the comparison to a first output and the comparator compares the threshold value to the output of the second counter and outputs the result of the comparison to a second output,
a first latch having an input coupled to the first output of the comparator,
a second latch having in input coupled to the second output of the comparator,
a multiplexor having a first input coupled to an output of the first latch and a second input coupled an output of the second latch, and a control input coupled to the output of the demodulator, and
a filter having an input coupled to an output of the multiplexor, a clock input coupled to the output of the demodulator, and an output for outputting the DQD signal.

31. A receiver circuit, the circuit comprising:
a radio frequency (RF) section that includes an amplifier configured to be coupled to an antenna and first and second mixers coupled to an output of the amplifier to recover first and second data channels, respectively;
a baseband section that includes a first baseband block with an input coupled to an output of the first mixer and a second baseband block with an input coupled to an output of the second mixer;
a demodulator having a first input coupled to an output of the first baseband block and a second input coupled to an output of the second baseband block;
a data and clock recovery circuit having an input coupled to an output of the demodulator;
a circuit coupled to the baseband section and configured to:
measure the number of transitions in a signal provided from the baseband section,
determine if a received packetized data transmission is present by comparing the measured number of transitions to an expected value of received transitions corresponding to the given deviation per bit-rate used to encode data bits of a received signal, and
only indicate the presence of a received packetized data transmission if the measured number of transitions is not different from the expected value of received transitions corresponding to the given deviation and bit-rate; and
a controller configured to control a receive frequency of the RF section and operable to frequency hop through each of a plurality of channel frequencies and, for each channel frequency, wait a first preset period of time after changing the channel frequency for an indication of the presence of a received packetized data transmission and, if no packetized data transmission is indicated to be present within the first preset period of time, resume frequency hopping and, if a packetized data transmission is indicated to be present, maintain a current channel frequency in order to receive a data packet of the packetized data transmission.

32. A method for medium access control in a receiver, the method comprising the steps of:
frequency hopping through each of a plurality of channel frequencies for the receiver;
monitoring a baseband section of the receiver using a circuit configured to:
measure the number of transitions in a signal provided from the baseband section,
determine if a received packetized data transmission is present by comparing the measured number of transitions to an expected value of received transitions corresponding to the given deviation and bit-rate used to encode data bits of a received signal, and
only indicate the presence of a received packetized data transmission if the measured number of transitions is not different from the expected value of received transitions corresponding to the given deviation per bit-rate;
waiting a first preset period of time after changing the channel frequency for each frequency hop and monitoring whether the presence of a received packetized data transmission is indicated;
resuming frequency hopping if the presence of a received packetized data transmission is not indicated within the first preset period of time; and
maintaining a current channel frequency in order to receive a data packet if the presence of a received packetized data transmission is indicated.

33. A receiver circuit, the circuit comprising:
a radio frequency (RF) section that includes an amplifier configured to be coupled to an antenna and first and second mixers coupled to an output of the amplifier to recover first and second data channels, respectively;
a baseband section that includes a first baseband block with an input coupled to an output of the first mixer and a second baseband block with an input coupled to an output of the second mixer;
a demodulator having a first input coupled to an output of the first baseband block and a second input coupled to an output of the second baseband block;
a data and clock recovery circuit having an input coupled to an output of the demodulator;
a data quality detector (DQD) circuit having a first input coupled to the output of the first baseband block and a second input coupled to the output of the second baseband block, where the data quality detector circuit is configured to assert a DQD signal when valid data is sensed at the output of the demodulator by counting spikes on received data and determining whether the number of spikes exceeds a predetermined threshold value; and
a controller configured to control a receive frequency of the RF section and monitor the DQD signal, where the controller is operable to frequency hop through each of a plurality of channel frequencies and, for each channel frequency, wait a first preset period of time after changing the channel frequency for the DQD signal to be asserted and, if the DQD signal is not asserted within the first preset period of time, resume frequency hopping and, if the DQD is asserted, maintain a current channel frequency in order to receive a data packet,
where the DQD circuit further comprises:
a first edge detector having an input coupled to the output of the first baseband block;
a second edge detector having an input coupled to the output of the second baseband block;
a phase detector having a first input coupled to an output of the first edge detector and a second input coupled to an output of the second edge detector;
a first counter having a clock input coupled to a first output of the phase detector and a reset input coupled to a second output of the phase detector;
a second counter having a clock input coupled to the second output of the phase detector and a reset input coupled to the first output of the phase detector;
a comparator having a first input coupled to an output of the first counter, a second input coupled to an output of the second counter, and a third input for receiving a threshold value, where the comparator compares the threshold value to the output of the first counter and outputs the result of the comparison to a first output and the comparator compares the threshold value to the output of the second counter and outputs the result of the comparison to a second output;
a first latch having an input coupled to the first output of the comparator;
a second latch having in input coupled to the second output of the comparator;
a multiplexor having a first input coupled to an output of the first latch and a second input coupled an output of the second latch, and a control input coupled to the output of the demodulator; and
a filter having an input coupled to an output of the multiplexor, a clock input coupled to the output of the demodulator, and an output for outputting the DQD signal.

* * * * *

UNITED STATES PATENT AND TRADEMARK OFFICE
CERTIFICATE OF CORRECTION

PATENT NO. : 7,822,397 B2
APPLICATION NO. : 11/366675
DATED : October 26, 2010
INVENTOR(S) : Horvath et al.

Page 1 of 1

It is certified that error appears in the above-identified patent and that said Letters Patent is hereby corrected as shown below:

In the Claims:

In claim 3, column 11, line 19, delete "where the third present," and insert --where the third--.

Signed and Sealed this
Twenty-third Day of April, 2013

Teresa Stanek Rea
*Acting Director of the United States Patent and Trademark Office*